(12) United States Patent
Wang et al.

(10) Patent No.: US 11,151,276 B1
(45) Date of Patent: Oct. 19, 2021

(54) SYSTEMS AND METHODS FOR DATA CERTIFICATE NOTARIZATION UTILIZING BRIDGING FROM PRIVATE BLOCKCHAIN TO PUBLIC BLOCKCHAIN

(71) Applicant: Trend Micro Incorporated, Tokyo (JP)

(72) Inventors: Tai-An Wang, Taipei (TW); Liang-Chih Chen, Taipei (TW); Ting-Yin Yen, Taipei (TW); Yu-Shu Chen, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 260 days.

(21) Appl. No.: 16/384,177

(22) Filed: Apr. 15, 2019

(51) Int. Cl.
*G06F 7/04* (2006.01)
*G06F 21/62* (2013.01)
*G06F 16/182* (2019.01)
*H04L 9/06* (2006.01)
*H04L 9/32* (2006.01)

(52) U.S. Cl.
CPC ...... *G06F 21/6227* (2013.01); *G06F 16/1824* (2019.01); *G06F 16/1834* (2019.01); *H04L 9/0643* (2013.01); *H04L 9/3268* (2013.01); *H04L 2209/38* (2013.01)

(58) Field of Classification Search
CPC . H04L 2209/38; H04L 9/0643; H04L 9/3268; G06F 16/2365; G06F 21/57; G06F 21/6227; G06F 16/1824; G06F 16/1834
See application file for complete search history.

(56) References Cited

U.S. PATENT DOCUMENTS

| | | | | |
|---|---|---|---|---|
| 10,114,980 B2* | 10/2018 | Barinov | | G06F 21/645 |
| 10,255,460 B2* | 4/2019 | Wilson | | H04N 1/32133 |
| 10,764,271 B2* | 9/2020 | Byszio | | H04L 63/0876 |
| 2006/0253703 A1* | 11/2006 | Eronen | | H04L 63/0823 |
| | | | | 713/156 |
| 2010/0293382 A1* | 11/2010 | Hammad | | H04L 9/3234 |
| | | | | 713/173 |
| 2012/0143830 A1* | 6/2012 | Cormode | | G06F 16/24568 |
| | | | | 707/687 |
| 2017/0243193 A1* | 8/2017 | Manian | | G06Q 20/065 |
| 2017/0329980 A1* | 11/2017 | Hu | | G06F 21/78 |
| 2017/0352012 A1* | 12/2017 | Hearn | | G06Q 50/18 |

(Continued)

*Primary Examiner* — Lizbeth Torres-Diaz
(74) *Attorney, Agent, or Firm* — Patrick D. Benedicto

(57) ABSTRACT

One embodiment disclosed relates to a system for managing data for logistics, sourcing and/or production. The system includes: a private blockchain maintained by a first network of nodes; a trusted public blockchain maintained by a second network of nodes; a private agent system; and a bridge system connected to both the private blockchain and the public blockchain. The private agent system operates to extract blocks of metadata from the private blockchain and utilize a hash tree structure to generate a first root hash value from the blocks of metadata. The bridge system operates to verify the first root hash value and store the first root hash value as a notarized data certificate in the trusted public blockchain. Another embodiment disclosed relates to a method for data certificate notarization utilizing a bridging system from a private blockchain to a trusted public blockchain. Other embodiments and features are also disclosed.

10 Claims, 9 Drawing Sheets

(56) References Cited

U.S. PATENT DOCUMENTS

| | | | | |
|---|---|---|---|---|
| 2018/0025145 | A1* | 1/2018 | Morgner | G06F 21/33 |
| | | | | 726/4 |
| 2018/0025181 | A1* | 1/2018 | Barinov | G06F 21/645 |
| | | | | 726/26 |
| 2018/0130050 | A1* | 5/2018 | Taylor | H04L 9/3247 |
| 2018/0276663 | A1* | 9/2018 | Arora | H04L 9/0861 |
| 2018/0302417 | A1* | 10/2018 | Wilson | G06F 16/24 |
| 2018/0330348 | A1* | 11/2018 | Uhr | G06Q 20/4014 |
| 2019/0036710 | A1* | 1/2019 | Qiu | H04L 9/3239 |
| 2019/0122208 | A1* | 4/2019 | Richardson | H04L 9/14 |
| 2019/0163887 | A1* | 5/2019 | Frederick | G06Q 50/01 |
| 2019/0253434 | A1* | 8/2019 | Biyani | H04L 63/065 |
| 2019/0306147 | A1* | 10/2019 | Uhr | G06F 16/1824 |
| 2019/0306148 | A1* | 10/2019 | Uhr | H04L 63/126 |
| 2019/0306235 | A1* | 10/2019 | Veale | H04L 63/123 |
| 2019/0333058 | A1* | 10/2019 | Hong | G06Q 20/3829 |
| 2020/0067909 | A1* | 2/2020 | Byszio | H04L 63/0861 |
| 2020/0177391 | A1* | 6/2020 | Qiu | H04L 9/0637 |
| 2020/0252202 | A1* | 8/2020 | Madl | G06F 21/6218 |
| 2020/0273025 | A1* | 8/2020 | Sharma | G06Q 20/3674 |
| 2020/0280453 | A1* | 9/2020 | Qiu | H04L 61/1535 |
| 2020/0342449 | A1* | 10/2020 | Lai | G06F 16/2379 |
| 2020/0344043 | A1* | 10/2020 | Komarov | H04L 9/3239 |
| 2020/0366486 | A1* | 11/2020 | Qiu | G06F 16/2379 |
| 2020/0402025 | A1* | 12/2020 | Wang | G06Q 10/10 |
| 2021/0036857 | A1* | 2/2021 | Qiu | H04L 9/3226 |
| 2021/0052981 | A1* | 2/2021 | Yi | A63F 13/77 |

* cited by examiner

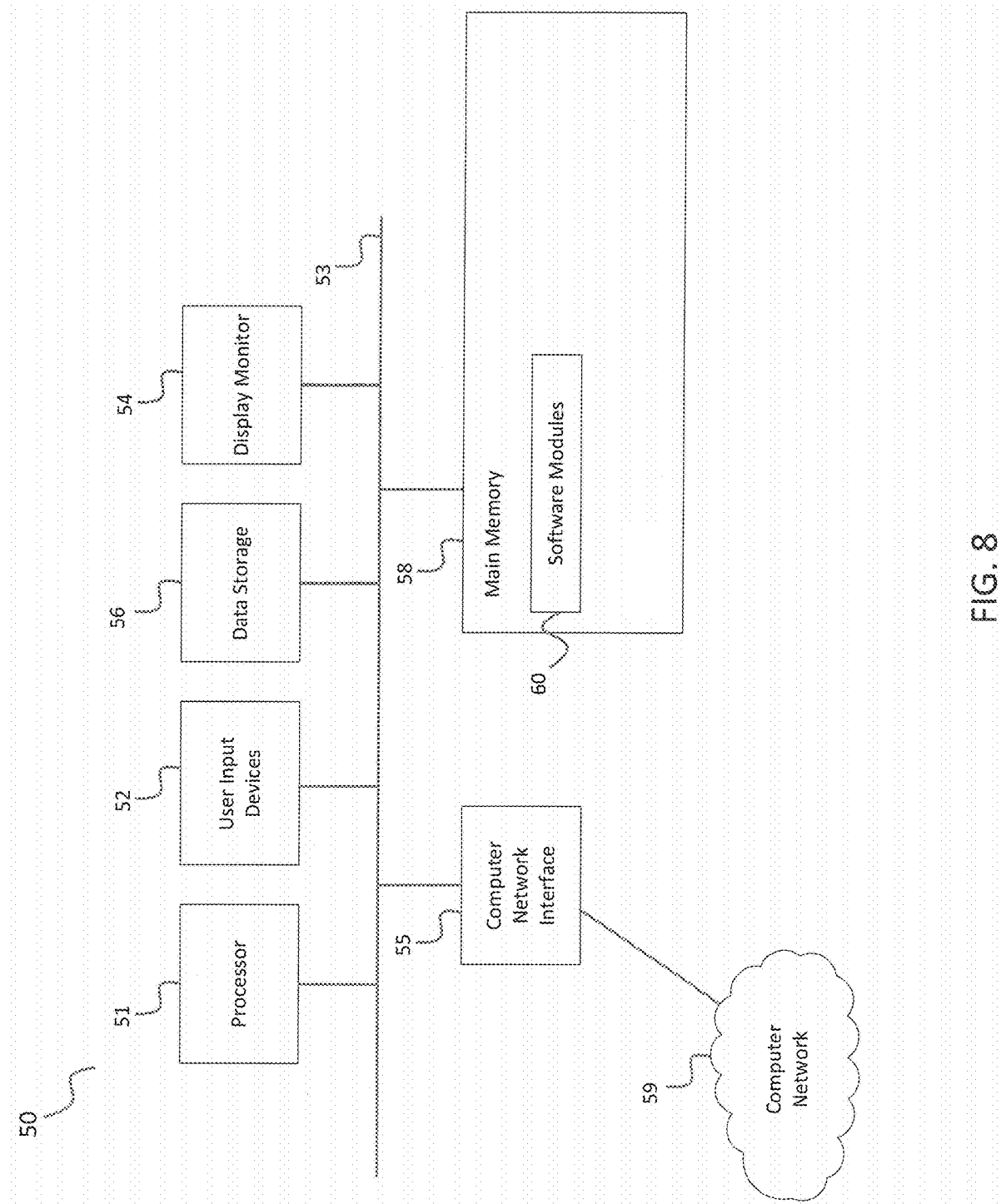

SYSTEMS AND METHODS FOR DATA CERTIFICATE NOTARIZATION UTILIZING BRIDGING FROM PRIVATE BLOCKCHAIN TO PUBLIC BLOCKCHAIN

BACKGROUND OF THE INVENTION

1. Field of the Invention

The present disclosure relates generally to data security. More particularly, the present disclosure relates to, but is not limited to, data notarization.

2. Description of the Background Art

A blockchain may be used as a distributed ledger to store information. In the case where various entities may provide entries to a public blockchain, the validity of the entries in a blockchain need to be confirmed as valid. This confirmation may utilize a decentralized consensus-based process, where the integrity of the blockchain is determined authoritatively by the consensus of nodes of a decentralized network.

SUMMARY

One embodiment disclosed relates to a system for managing data for logistics, sourcing and/or production. The system includes: a private blockchain maintained by a first network of nodes; a trusted public blockchain maintained by a second network of nodes; a private agent system; and a bridge system connected to both the private blockchain and the public blockchain. The private agent system operates to extract blocks of metadata from the private blockchain and utilize a hash tree structure to generate a first root hash value from the blocks of metadata. The bridge system operates to verify the first root hash value and store the first root hash value as a notarized data certificate in the trusted public blockchain.

Another embodiment disclosed relates to a method for data certificate notarization utilizing a bridging system from a private blockchain to a trusted public blockchain. Blocks of metadata are extracted from the private blockchain, each said block of metadata including a hash of original data. A hash tree structure is utilized to generate a first root hash value from the blocks of metadata. A bridge system is utilized to verify the first root hash value and store the first root hash value as a notarized data certificate in the trusted public blockchain.

Other embodiments and features are also disclosed.

These and other features of the present invention will be readily apparent to persons of ordinary skill in the art upon reading the entirety of this disclosure, which includes the accompanying drawings and claims.

BRIEF DESCRIPTION OF THE DRAWINGS

FIG. 8 is a logical diagram of a computer system in accordance with an embodiment of the present invention.

The use of the same reference label in different drawings indicates the same or like components.

DETAILED DESCRIPTION

While public blockchains, such as the BITCOIN blockchain, are used famously for cryptocurrencies, private blockchains may be useful in industrial and other applications. For example, private blockchains may be well-suited for use in the Internet of Things (IoT) or the Industrial Internet of Things (IIoT). However, private blockchain solutions for industrial applications also have drawbacks and limitations.

Public Blockchain Limitations and Drawbacks

As disclosed herein, using a public blockchain for industrial applications has various limitations and problems. In particular, a public blockchain with a decentralized consensus generally has limited transaction speeds and constrained capacity for dealing with a large number of transactions. The conventional behavior of a public chain is that all computing nodes are designed to verify the transaction by a consensus mechanism and synchronize the transaction data so that every computing node in the blockchain network all over the world can keep the same ledger. However, this design is a key reason as to why the transaction speed and numbers are restricted for public blockchains.

Consider the case where a public blockchain network has 100,000 computing nodes and that each computing node has that capability to deal with 5,000 transactions per day. In this case, even though there are a total of 100,000 computing nodes, the public blockchain is still limited to dealing with 5,000 transactions per day in order to synchronize the transaction data. In other words, the fact that there are 100,000 computing nodes does not scale up the number of transactions per day which may be added to the blockchain.

Centralized System Solution

Figure 1:
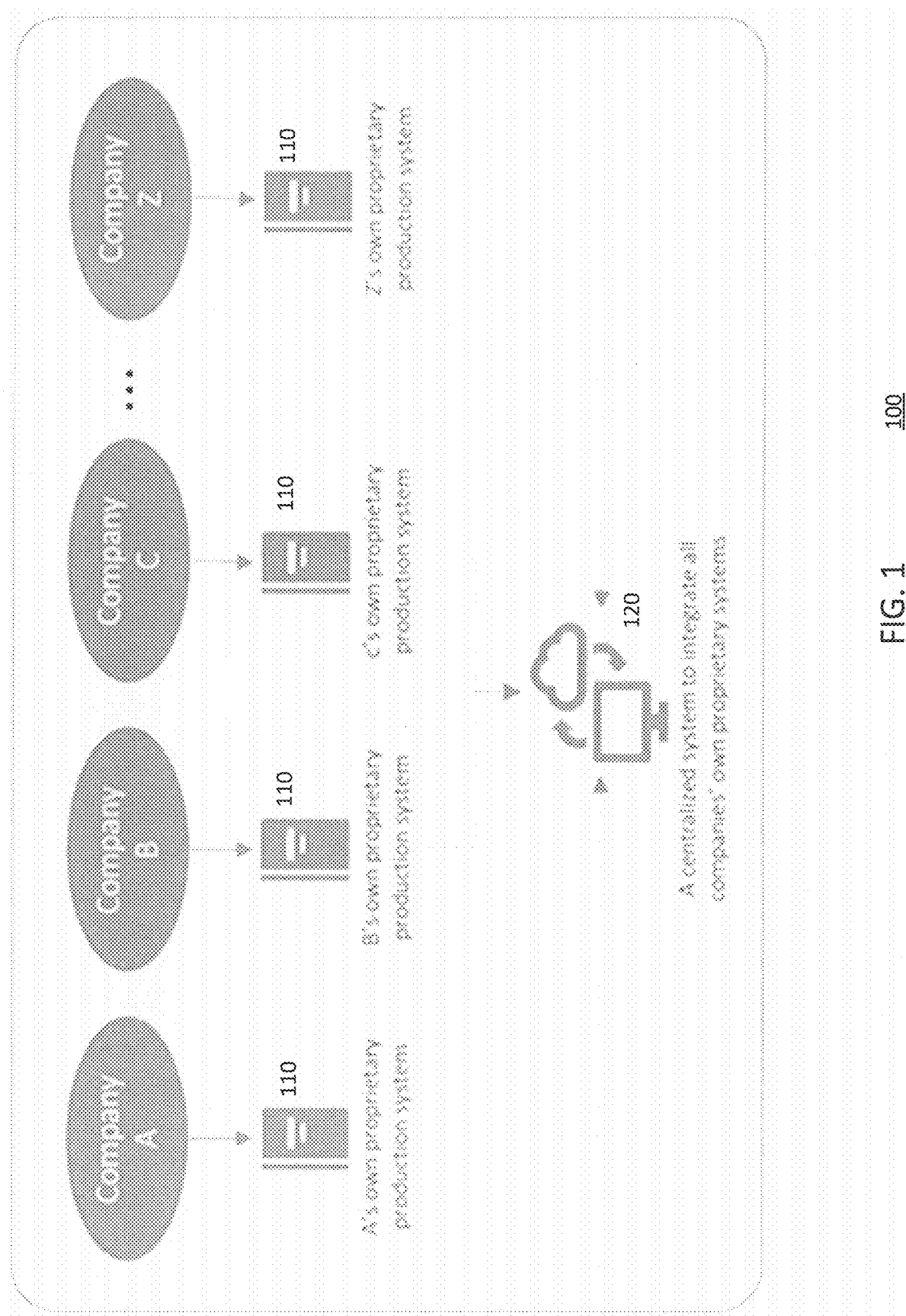
FIG. 1 depicts a centralized system for managing logistics, sourcing and/or production.

As disclosed herein, there are issues and problems with implementing a management system for logistics, sourcing and/or production using a centralized system to hold the entirety of the data and act as the data administrator. For example, consider the management system 100 depicted in FIG. 1.

The management system 100 has a central system 110, implemented using a cloud system, which holds the whole data and plays a data administrator role. Multiple companies (Company A, Company B, Company C, . . . , Company Z) each has its own proprietary production system 110. However, implementation of the management system 100 may be problematic in that it requires a huge development effort for system integration to integrate the different data sources, interfaces and formats from the proprietary production systems 110 of the different companies. Furthermore, there is an issue as to which party owns the central system 120. The party owning the central system 120 must be agreed upon by all the various companies, and such agreement may be difficult when the key value of the management system lies with the central system 120.

Private Blockchain Solution

Figure 2A:
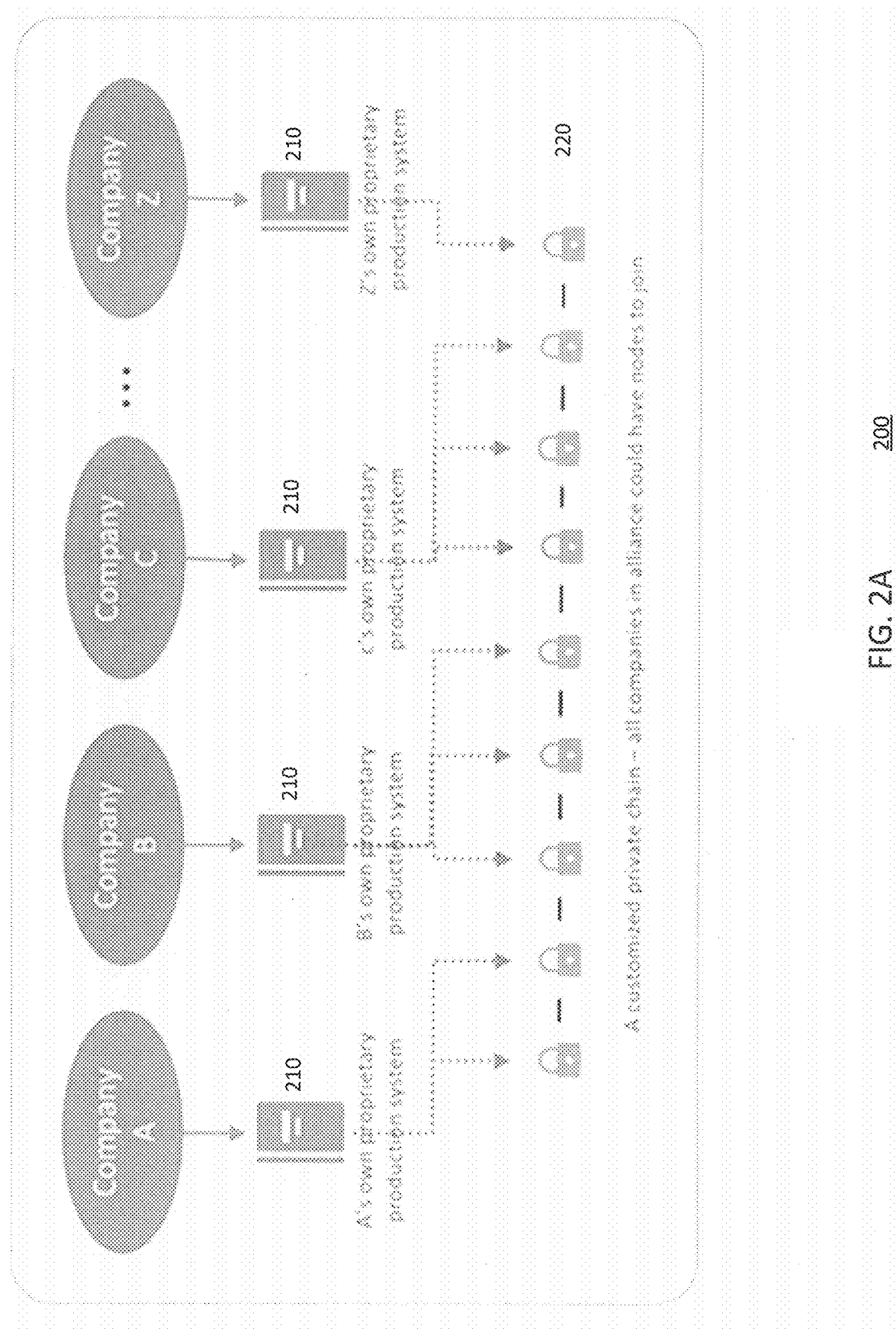
FIGS. 2A and 2B depict a private blockchain based system for managing logistics, sourcing and/or production.

As disclosed herein, a customized private blockchain solution may be implemented to offer a lower-cost, decentralized management solution for multiple companies to use. As depicted in FIG. 2A, such a management system 200 may use a customized private blockchain 220. The private blockchain 220 is customized in that it does not need to store all of the user data from each of multiple companies (Company A, Company B, Company C, . . . , Company Z), each having its own proprietary production system 210.

Figure 2B:
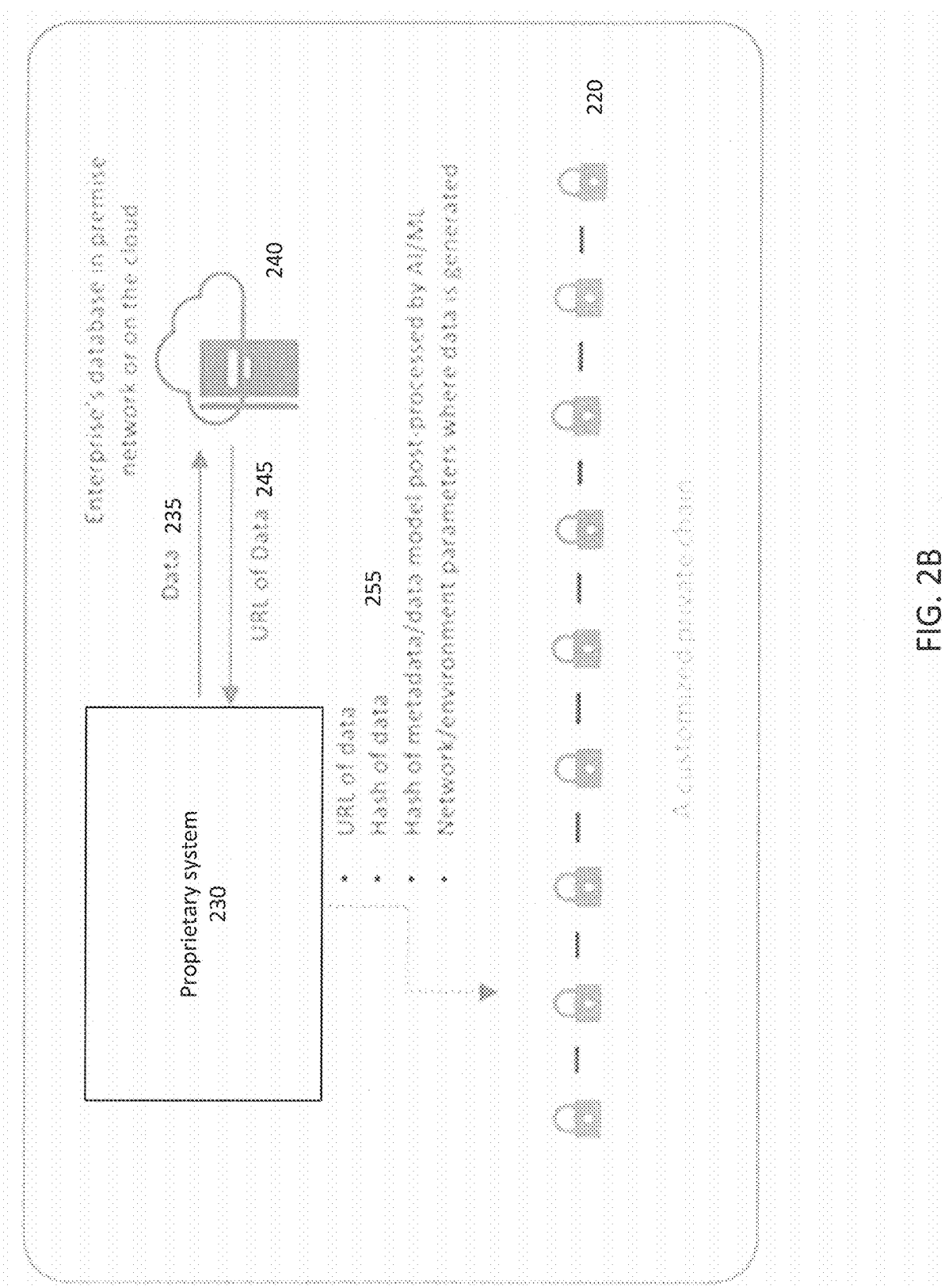

Rather, as depicted in FIG. 2B, user data 235 from a proprietary system (e.g., data from the Internet-of-Things endpoints or an enterprise) may be stored in a database 240 in an on-premise network or on a cloud system. A URL (universal resource locator) 245 of the data stored in the database may be returned to the proprietary system for locating the data. The private blockchain 220 only stores limited information 255 "on-chain" in the form of hashes of the user data, locators (e.g:, URLs) of the user data, and other metadata.

However, while the private blockchain solution shown in FIGS. 2A and 2B is lower-cost and decentralized, it has the drawback of lacking a mechanism for notarizing data referenced by the metadata in the private blockchain. In other words, this solution does not provide a trustable data certificate which may be relied upon by an authority or auditing party. For example, the authority or auditing party may be an environment related government institution that needs to audit air or water pollution data from various companies.

Solution Using Private Blockchain and Bridge to Public Blockchain

The presently-disclosed solution maintains the advantages of speed and capacity because the entire user data (for example, transactional data, logistic tracking data, machine-to-machine communication data, digital asset management data, and other user data) is not stored in the private blockchain 220. Rather, the private blockchain 220 stores only hashes of the user data (and other metadata).

Figure 3:
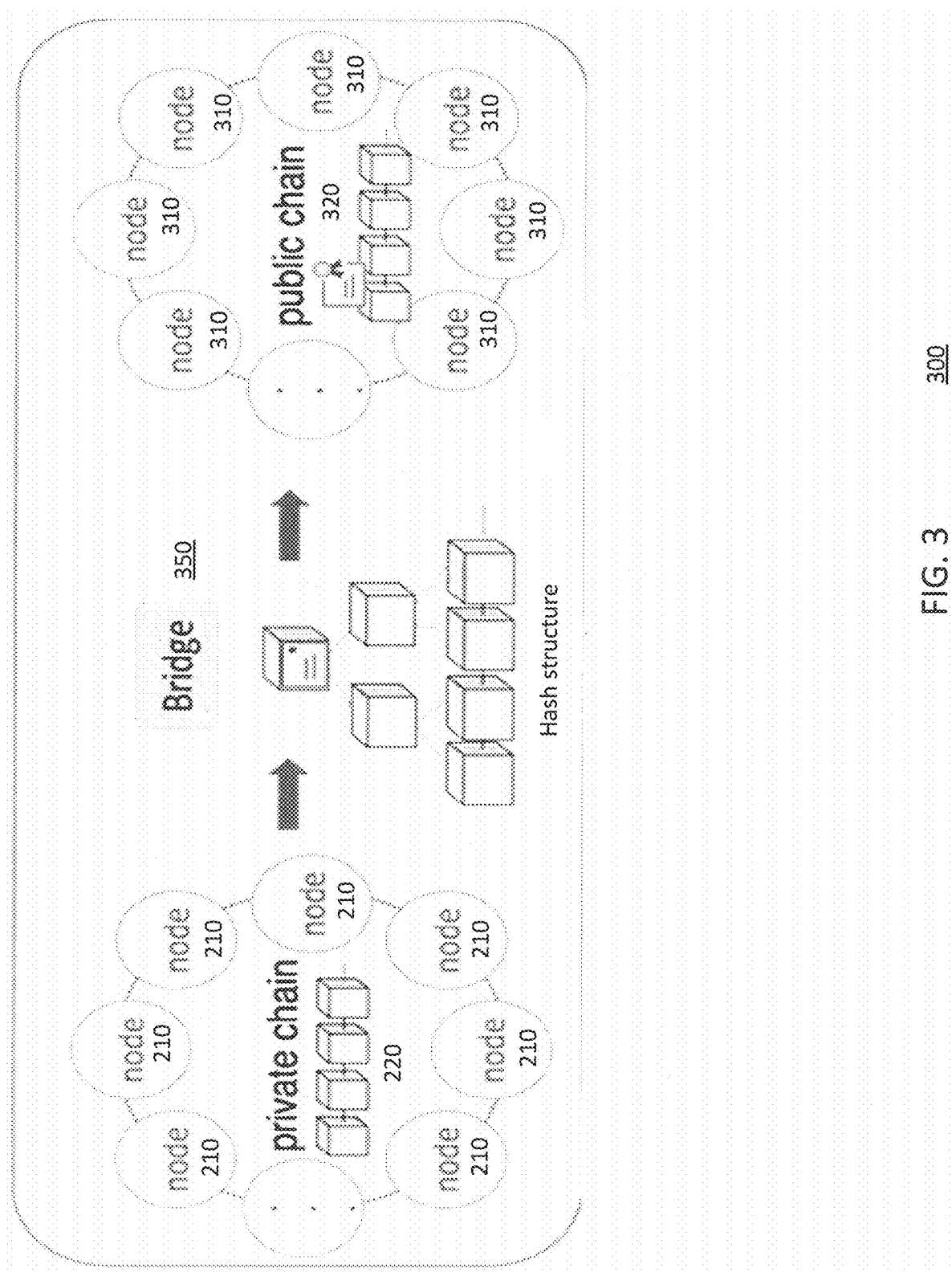
FIG. 3 depicts a system of data certificate notarization utilizing bridging from a private blockchain to a public blockchain in accordance with an embodiment of the invention.
Figure 4:
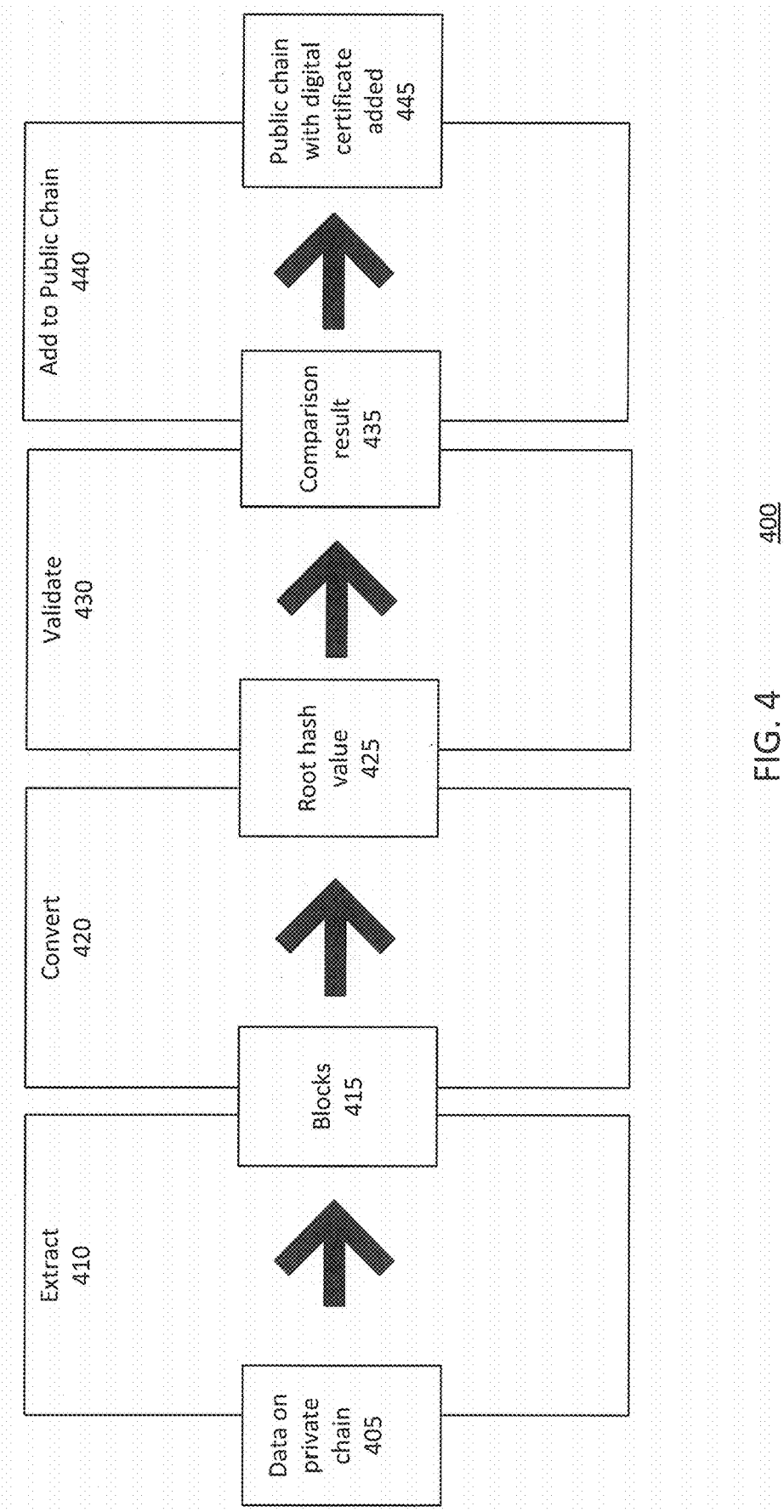
FIG. 4 depicts a method of data certificate notarization utilizing bridging from a private blockchain to a public blockchain in accordance with an embodiment of the invention.

However, the presently-disclosed solution goes further in that it also solves the above-discussed drawbacks to the private blockchain solution. In particular, the presently-disclosed solution overcomes the lack of notarization capability using a bridge mechanism 350 from the private blockchain 220 to a public blockchain 320. A system 300 and a method 400 using a private blockchain 220, a bridge system 350, and a public blockchain 320 are depicted FIGS. 3, 4 and 5 in accordance with an embodiment of the present invention. As depicted, the bridge system 350 may utilize a Merkle tree or other similar hash structure.

Private blockchain: Similar to the private blockchain 220 of FIG. 2, the private blockchain 220 (shown in FIGS. 3 and 5) may be customized in that it does not need to store all of the data from the various nodes 210 of the network of the private blockchain 220. Rather, the private blockchain 220 only needs to store limited information "on-chain" (on-chain data 405 in FIG. 4) in the form of hashes of the user data, URLs of the user data, and other metadata (see 255 in FIG. 5).

Bridging: Blocks of metadata (hashes, URLs, etc.) stored in the private blockchain 220 are extracted (extracted blocks 415 in FIGS. 4 and 5) over every period of time per the extraction step 410 of FIG. 4. The extracted blocks 415 may include not only raw metadata (for example, data hashes and URLs) but also timestamps and other critical information relating to the corresponding period of time.

Figure 5:
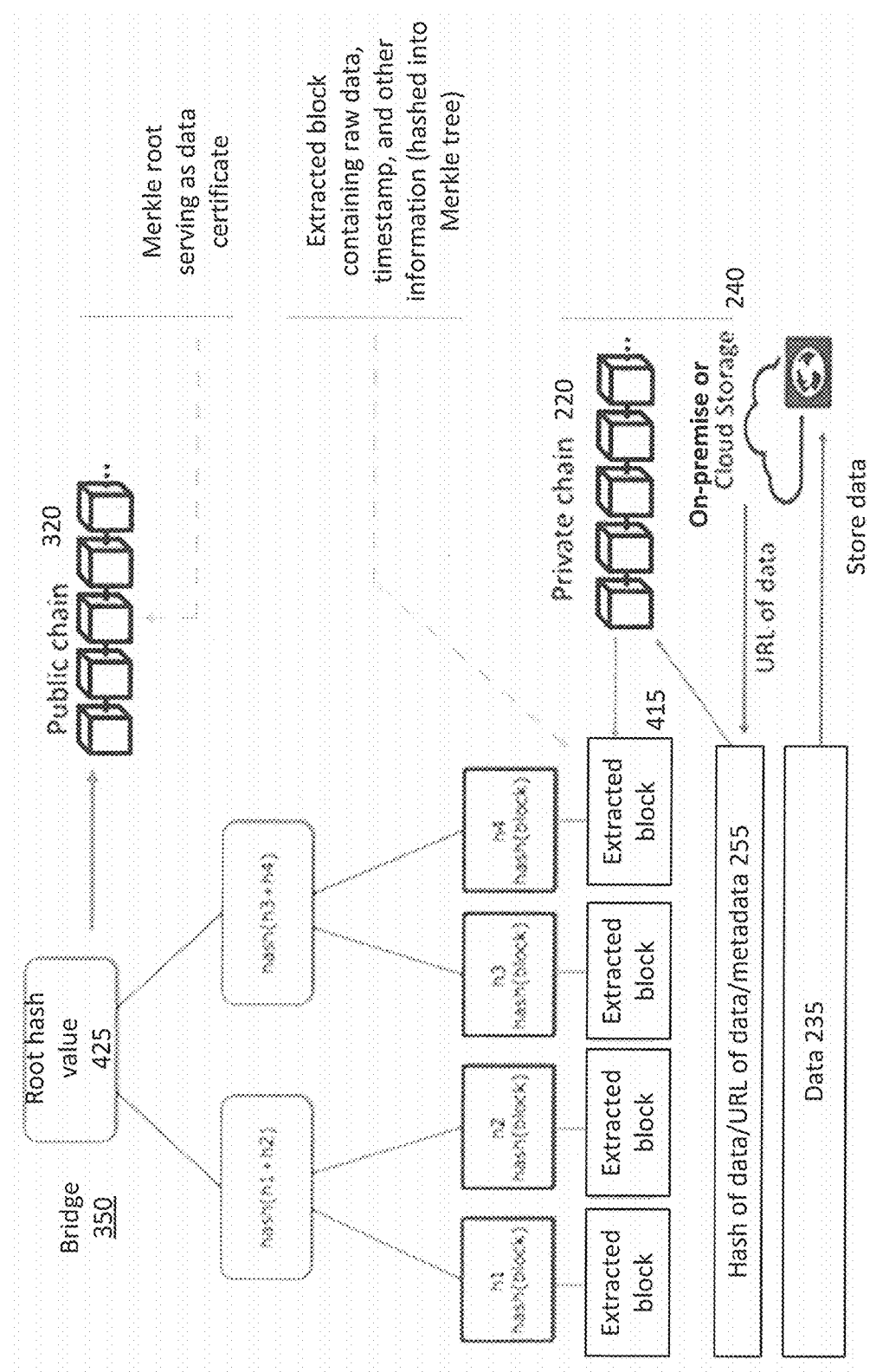
FIG. 5 is a diagram illustrating the operation of a system of data certificate notarization utilizing bridging from a private blockchain to a public blockchain in accordance with an embodiment of the invention.

Subsequently, a hash-based root (root hash value) 425 is generated based on the extracted blocks 415 per the conversion step 420. For example, such extracted blocks 415 are depicted as leaves (below hash values h1, h2, h3, h4 in FIG. 5) of the exemplary hash tree structure in FIG. 5. A hash value (for example, h1, h2, h3, or h4 in FIG. 5) of each extracted block of metadata 415 may be generated using a hash function (procedure). The hash function may be a cryptographic hash, for example. In particular, each block of metadata 415 may be hashed to generate a hash value (for example, hash values h1, h2, h3, h4 in FIG. 5) of a hash tree structure, such as a Merkle tree. Pairs of hash values at each level are put together and hashed to generate a further hash value which is stored one level higher in the tree. As depicted in FIG. 5, at the highest level, there is only one hash value, and that hash value corresponds to a root hash value 425 (e.g., a Merkle root). In other words, hash values of the tree may be repeatedly hashed in pairs so as to finally convert (step 420) the extracted blocks 415 to a root hash value (e.g., a Merkle root) 425 which is a hash of the blocks. Other structures, besides a Merkle tree, may be used to generate a root hash value.

The root hash value 425 may then be sent to the bridge system 350, which may comprise a plurality of bridge servers. In addition, blocks of original data 235 may be transferred to on-premise or cloud storage 240.

The root hash value 425 may then be validated by the bridge system per step 430. This validation may be performed by an authority system (or even the public in some implementations) acquiring the original data (for example, from cloud storage using the URL) and generating the root hash value using the hash tree structure. A comparison between the two hash values may then be made. If the root hash value to be validated matches the one which is generated, then the comparison result 435 indicates that the root hash value 425 is validated as correct.

Public blockchain: Once validated, the root hash value 425 may be added as a digital certificate to the public blockchain 320 to create a public blockchain with the digital certificate added 445 per step 440. The root hash values stored in the public blockchain 320 are notarized as immutable and trusted by consensus of the nodes 310 of the network maintaining the public blockchain 320.

In this way, the root hash values 425 are stored in a notarized manner in the public blockchain 320. These root hash values 425 in the public blockchain 320 may then be used to prove that the original data has not been tampered with and so has integrity. For example, when user data is provided by a company or other user entity, the integrity of that data may be verified calculating a root hash value based on that data and verifying that the calculated root hash value is the same as the corresponding root hash value 425 stored in the public blockchain 320. Thus, the above-discussed system and method depicted in FIGS. 3-5 solves the problem of trust in the private blockchain solution depicted in FIGS. 2A and 2B.

Figure 6:
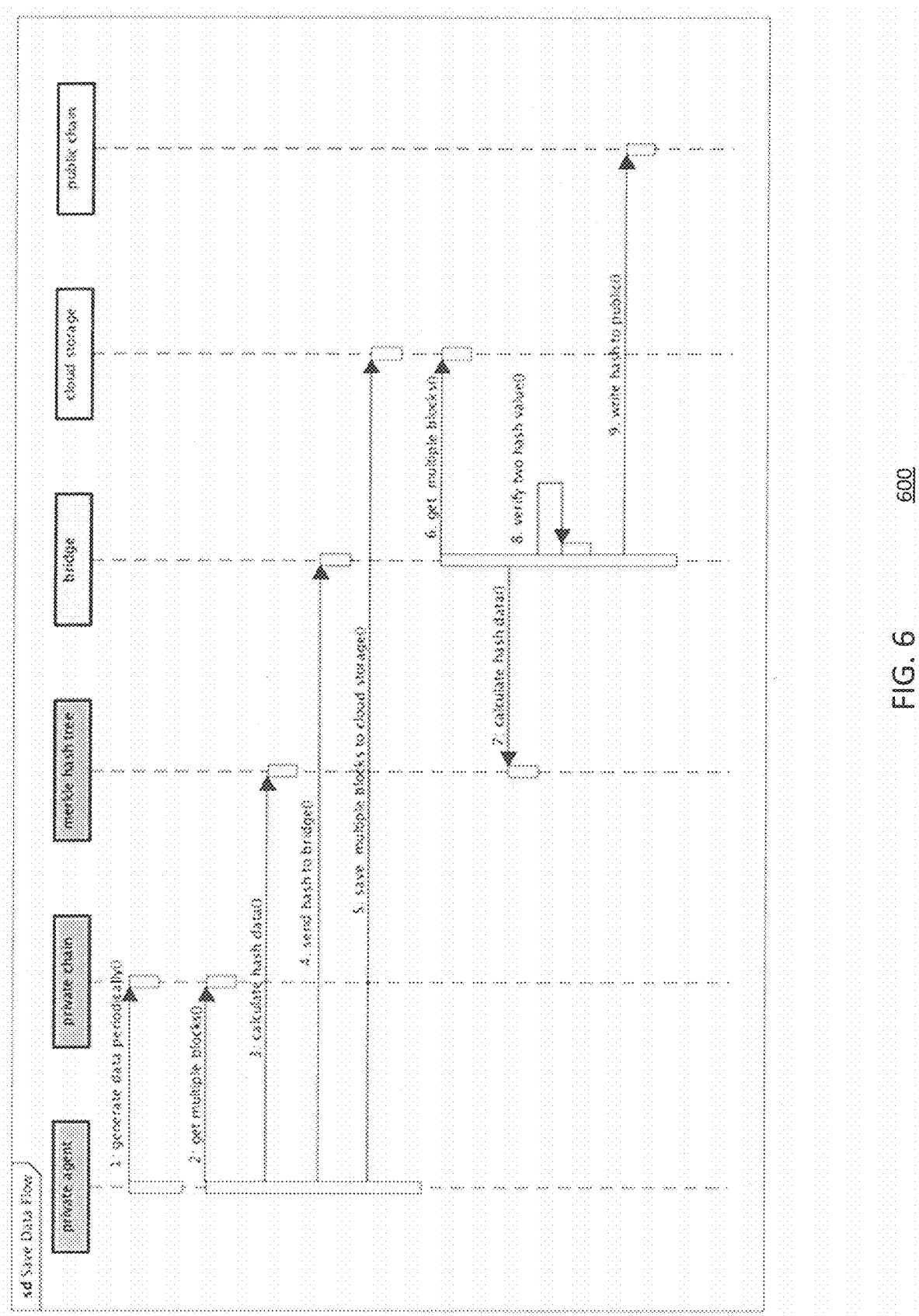
FIG. 6 depicts a method of saving or storing data with notarization in accordance with an embodiment of the invention.

Saving Data: FIG. 6 depicts a method 600 of saving or storing data with notarization in accordance with an embodiment of the invention. Per step 1, a private agent system periodically generates original data, calculates hashes of the data and other metadata, packs all of the data 255 (FIG. 2B) and makes a transaction to a private blockchain 220. The private blockchain network of nodes 210 subsequently stores the packed data 255 as a block on private blockchain 220 via mining.

Per step 2, multiple blocks of metadata may be gotten or retrieved by the private agent system from the private blockchain. Per step 3, the private agent system may calculate hash values from the multiple blocks of metadata, and a Merkle hash tree (or other similar hash tree structure) may be utilized by the private agent system to generate a root hash value. Per step 4, the root hash value may be sent by the private agent system to the bridge system. In addition, per step 5, the private agent system may save the multiple blocks of original data to cloud storage system.

Per step 6, the bridge system may get the multiple blocks of data from the cloud storage system. Per step 7, the bridge system may calculate hash values from the multiple blocks of data, and a Merkle hash tree (or other similar hash tree structure) may be utilized by the private agent to generate a root hash value. Per step 8, the bridge system may then compare the root hash value that it calculated against the root hash value from the private agent system. Finally, if the two root hash values match, then the verified root hash value may be written to the trustable public blockchain per step 9.

Figure 7:
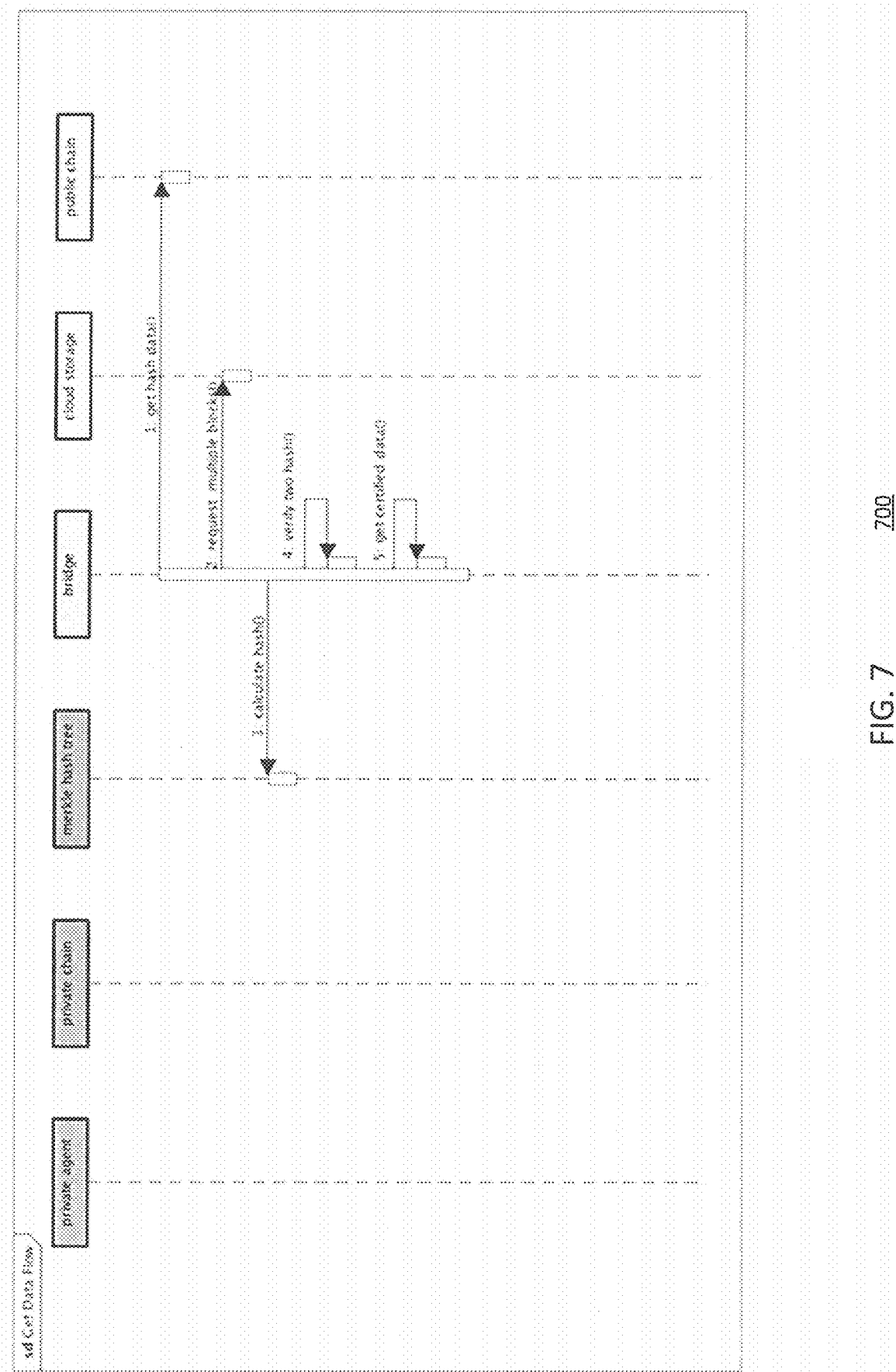
FIG. 7 depicts a method of getting or retrieving data with notarization in accordance with an embodiment of the invention.

Getting Data: FIG. 7 depicts a method 700 of getting or retrieving data with notarization in accordance with an embodiment of the invention. Per step 1, the bridge system gets a root hash value (hash data) from the trustable public blockchain. Per step 2, the bridge system requests multiple blocks of data from the cloud storage system. Per step 3, the bridge system calculates hash values from the multiple blocks of data, and a Merkle hash tree (or other similar hash tree structure) may be utilized by the bridge system to generate a root hash value. Per step 4, the bridge system may then compare the root hash value that it calculated against the root hash value from the public blockchain. Finally, if the two root hash values match, then the bridge system may certify that the data obtained from the cloud storage is valid per step 5.

Computer System

Referring now to FIG. 8, there is shown a logical diagram of a computer system 50 in accordance with an embodiment of the present invention. The computer system 50 may be employed as a network security device, a client device, or a cloud security system, for example. The computer system 50 may have fewer or more components to meet the needs of a particular application. The computer system 50 may include one or more processors 51. The computer system 50 may have one or more buses 53 coupling its various components. The computer system 50 may include one or more user input devices 52 (e.g., keyboard, mouse), one or more data storage devices 56 (e.g., hard drive, optical disk, solid state drive), a display monitor 54 (e.g., liquid crystal display, flat panel monitor), a computer network interface 55 (e.g., network adapter, modem), and a main memory 58 (e.g., random access memory). The computer network interface 55 may be coupled to a computer network 59.

The computer system 50 is a particular machine as programmed with one or more software modules, comprising instructions stored non-transitory in the main memory 58 for execution by the processor 51 to cause the computer system 50 to perform corresponding programmed steps. An article of manufacture may be embodied as computer-readable storage medium including instructions that when executed by the processor 51 cause the computer system 50 to be operable to perform the functions of the one or more software modules 60. Such a computer system 50 may be used to implement various devices and apparatus in the systems depicted in the prior figures and described herein.

CONCLUSION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for managing data for logistics, sourcing or production, the system comprising:
    a private blockchain maintained by a first network of nodes;
    a trusted public blockchain maintained by a second network of nodes;
    a private agent system which operates to extract blocks of metadata from the private blockchain, each said block of metadata including a hash of original data, and utilize a hash tree structure to generate a first root hash value from the bocks of metadata,
    a bridge system comprises a plurality of servers connected to both the private blockchain and the trusted public blockchain, wherein the bridge system operates to verify the first root hash value and store the first root hash value as a notarized-data certificate in the trusted public blockchain; and
    a storage system at which the original data is stored,
    wherein each said block of metadata further includes a locator for obtaining the original data from said storage system,
    wherein the first root hash value is verified by the bridge system by using the locator to retrieve the original data from said storage system,
    calculating a second root hash value from the retrieved original data, and comparing the first and second root hash values to verify that they match, and
    wherein the first root hash value is stored as a notarized data certificate in the trusted public blockchain after said verification of the first root hash value.

2. The system of claim 1, wherein the hash tree structure comprises a Merkle tree.

3. The system of claim 1, wherein the bridge system getting the first root hash value by a data-using system from the trusted public blockchain; retrieving the original data by the data-using system from said storage system; calculating a third root hash value from the retrieved original data; and comparing the first and third root hash values to verify that they match so as to confirm notarization of the data certificate before using the original data.

4. The system of claim 1, wherein the storage system comprises an on-premise storage system.

5. The system of claim 1, wherein the storage system comprises a cloud storage system.

6. A method for data certificate notarization utilizing a bridging system from a private blockchain to a trusted public blockchain, the method comprising:

extracting blocks of metadata from the private blockchain, each said block of metadata including a hash of original data, wherein each said block of metadata further includes a locator for obtaining the original data from a storage system which stores the original data;
utilizing a hash tree structure to generate a first root hash value from the blocks of metadata;
using a bridge system, comprising of a plurality of servers connected to both the private blockchain and the trusted public blockchain, to verify the first root hash value and store the first root hash value as a notarized data certificate in the trusted public blockchain;
verifying, by the bridge system, the first root hash value by using the locator to retrieve the original data from said storage system;
calculating a second root hash value from the retrieved original data, and
comparing the first and second root hash values to verify that they match,
wherein the first root hash value is stored as a notarized data certificate in the trusted public blockchain after said verification of the first root hash value.

7. The method of claim 6, wherein the hash tree structure comprises a Merkle tree.

8. The method of claim 6 further comprising: getting the first root hash value by a data-using system from the trusted public blockchain; retrieving the original data by the data-using system from said storage system; calculating a third root hash value from the retrieved original data; and comparing the first and third root hash values to verify that they match so as to confirm notarization of the data certificate before using the original data.

9. The method of claim 6, wherein the storage system comprises an on-premise storage system.

10. The method of claim 6, wherein the storage system comprises a cloud storage system.

* * * * *